(12) United States Patent
Morishita

(10) Patent No.: US 7,823,079 B2
(45) Date of Patent: Oct. 26, 2010

(54) COMPUTER READABLE RECORDING MEDIUM RECORDED WITH GRAPHICS EDITING PROGRAM, AND GRAPHICS EDITING APPARATUS

(75) Inventor: Ryohei Morishita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 11/452,460

(22) Filed: Jun. 14, 2006

(65) Prior Publication Data
US 2007/0209020 A1   Sep. 6, 2007

(30) Foreign Application Priority Data
Mar. 2, 2006   (JP)   ............... 2006-055625

(51) Int. Cl.
*G06F 3/048* (2006.01)
(52) U.S. Cl. .................... 715/790; 715/763
(58) Field of Classification Search .......... 715/763, 715/790; 717/105, 113, 116; 707/999.103–999.107
See application file for complete search history.

(56) References Cited

U.S. PATENT DOCUMENTS

| | | | |
|---|---|---|---|
| 5,631,697 A * | 5/1997 | Nishimura et al. | 348/172 |
| 6,085,187 A * | 7/2000 | Carter et al. | 707/3 |
| 6,704,743 B1 * | 3/2004 | Martin | 707/103 R |
| 2001/0001555 A1 * | 5/2001 | Bricklin et al. | 345/302 |
| 2002/0016954 A1 * | 2/2002 | Charisius et al. | 717/2 |
| 2002/0111962 A1 * | 8/2002 | Crucs | 707/505 |
| 2002/0175948 A1 * | 11/2002 | Nielsen et al. | 345/781 |
| 2003/0154191 A1 * | 8/2003 | Fish et al. | 707/2 |
| 2004/0098406 A1 * | 5/2004 | Roddy | 707/103 R |
| 2007/0122000 A1 * | 5/2007 | Venetianer et al. | 382/103 |

FOREIGN PATENT DOCUMENTS

JP       07-325690       12/1995

* cited by examiner

*Primary Examiner*—Kieu Vu
*Assistant Examiner*—Haoshian Shih
(74) *Attorney, Agent, or Firm*—Greer, Burns & Crain, Ltd.

(57) ABSTRACT

When an element is interactively arranged in cooperative with an input device and a display device, if at least a part of the arranged element is overlapped with an already arranged element, the relation of the already arranged element is inherited and association is made between these elements to provide a relation therebetween, thereby displaying the relation. Therefore, it becomes possible to inherit the relation of the already arranged element with a simple operation. Thereby, it is possible to easily provide a relation between elements by associating the elements with one another while reflecting the intention of user as much as possible.

4 Claims, 5 Drawing Sheets

FIG.2

| ELEMENT | RELATION |
|---|---|
| ELEMENT 1 | RELATION 1 |
| ELEMENT 2 | RELATION 1 |

FIG.3

| RELATION | CONNECTION STATE |
|---|---|
| RELATION 1 | ELEMENT 1 - ELEMENT 2 |

FIG.6

| ELEMENT | RELATION |
|---|---|
| ELEMENT 1 | RELATION 1, RELATION 2 |
| ELEMENT 2 | RELATION 1 |
| ELEMENT 3 | RELATION 2 |

FIG.7

| RELATION | CONNECTION STATE |
|---|---|
| RELATION 1 | ELEMENT 1 - ELEMENT 2 |
| RELATION 2 | ELEMENT 1 - ELEMENT 3 | ns # COMPUTER READABLE RECORDING MEDIUM RECORDED WITH GRAPHICS EDITING PROGRAM, AND GRAPHICS EDITING APPARATUS

BACKGROUND OF THE INVENTION

1. Field of the Invention

The present invention generally relates to a technology for easily providing the relation between elements while reflecting the intent of user as much as possible, in a graphics editing technology for performing the system development or the like in a visual environment using graphics. More particularly, the present invention relates to a computer readable recording medium recorded with a graphics editing program, and a graphics editing apparatus.

2. Description of the Related Art

In recent years, a UML (Unified Modeling Language) tool as a graphics editor has been widely used, for performing efficiently the system development or the like in a visual environment. The UML tool provides functions of preparing and editing, as a fundamental design diagram of a system, a use-case diagram, an activity diagram, a state machine diagram, a sequence diagram, a class diagram and the like, in each of which various elements are connected to each other depending on the relation thereof. In an operation of the UML tool, since the relation between elements need to be provided by associating the elements, after the elements are arranged, it is necessary to designate two elements using an input device such as a mouse or the like, to provide the relation between the two elements. Therefore, in order to easily provide the relation between elements, as disclosed in Japanese Unexamined Patent Publication No. 7-325690, there has been proposed a technology for identifying an element which is present within a predetermined distance from a new arranged element, to automatically provide the relation between these elements by association.

However, in the conventionally proposed technology, the relation between the elements is provided by associating the elements with one another, based on the distance relation between these elements. Therefore, when the general view of the system having a tree structure is prepared, there is a possibility that the intention of a user is not necessarily reflected. Namely, in the tree structure, it is necessary to relate a plurality of elements to an element in an upper hierarchy. However, if elements in the same hierarchy are arranged close to each other, the relation is provided between these elements.

The present invention has been accomplished with a view to solving the above problem in the conventional technology and has an object to provide a graphics editing technology capable of easily providing the relation between elements while reflecting the intent of a user as much as possible, by inheriting the relation of an already arranged element.

SUMMARY OF THE INVENTION

In order to achieve the above object, in a graphics editing technology according to the present invention, when an element is arranged interactively, if at least a part of the arranged element is overlapped with an already arranged element, the relation of the already arranged element is inherited, to thereby make the relation between the arranged element and the already arranged element, and then, the relation between them is displayed. The "arrangement" herein means the concept containing the arrangement in which the already arranged element is moved to be re-arranged, in addition to the arrangement of a new element.

Accordingly, when a fundamental design diagram or the like of a system having a tree structure is prepared, if an element is interactively arranged to be overlapped with an already arranged element, the relation of the already arranged element is inherited, to thereby associate the arranged element with the already arranged element so as to provide a relation therebetween. Therefore, it becomes possible to inherit the relation of the already arranged element with a simple operation, thereby easily providing the relation between elements while reflecting the intention of a user as much as possible.

At this time, when the interactively arranged element is overlapped with a plurality of elements, it is desirable to associate elements with one another so as to provide a relation therebetween through inheriting of the relation of the element whose overlapped region is the largest.

The other objects, features and advantages of the present invention will be apparent from the following description of the embodiment with reference to the accompanying drawings.

BRIEF DESCRIPTION OF THE DRAWINGS

FIG. 2 is an explanatory diagram of an element relation table;

FIG. 3 is an explanatory diagram of a relation connection table;

FIG. 6 is an explanatory diagram of the element relation table which is updated with the element arrangement; and FIG. 7 is an explanatory diagram of the relation connection table which is updated with the element arrangement.

DESCRIPTION OF THE PREFERRED EMBODIMENT

Hereinafter, the present invention will be described with reference to drawings.

Figure 1:
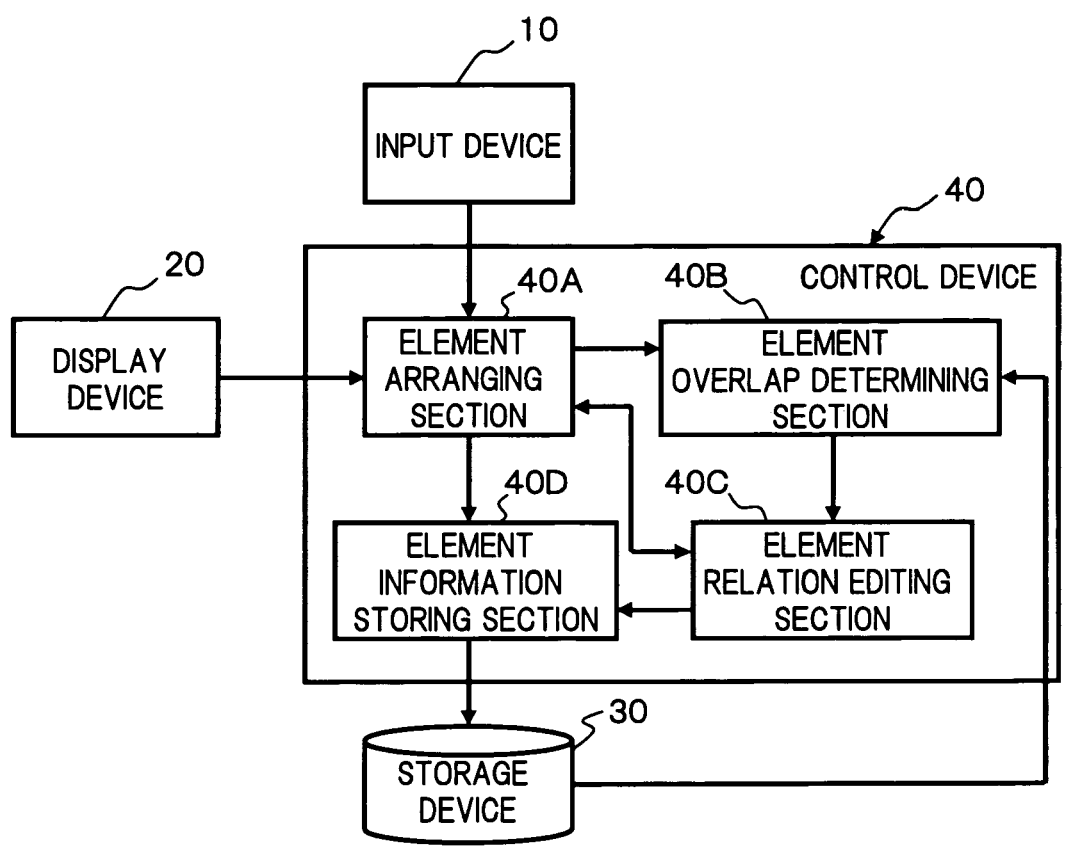
FIG. 1 is an entire block diagram of a graphics editing apparatus which realizes the present invention.

FIG. 1 shows an entire configuration of a graphics editing apparatus which realizes a graphics editing technology according to the present invention.

The graphics editing apparatus is constructed by installing a graphics editing program recorded in a computer readable recording medium, such as a CD-ROM, a DVD-ROM or the like, in an all-purpose computer such as a PC (Personal Computer). More specifically, the graphics editing apparatus includes: an input device 10 provided with a pointing device, such as a mouse, and a keyboard; a display device 20 comprised of a CRT (Cathode Ray Tube) or a LCD (Liquid Crystal Display) or the like; a storage device 30 comprised of a hard disk or the like; and a control device 40 provided with a memory and a CPU (Central Processing Unit).

In the storage device 30, as information of elements constituting a fundamental design diagram of a system or the like, in addition to the properties describing types of the elements and arrangement positions thereof or the like, there are registered an element relation table as shown in FIG. 2 and a relation connection table as shown in FIG. 3 respectively. The element relation table describes the relation of each element in association with the respective elements. Further, the relation connection table describes connection states between the elements in association with each relation.

On the other hand, in the control device 40, the graphics editing program is executed, so that an element arranging section 40A, an element overlap determining section 40B, an element relation editing section 40C and an element information storing section 40D are realized, respectively. The element arranging section 40A provides a function of cooperating with the input device 10 and the display device 20, to interactively arrange elements. The element overlap determining section 40B provides a function of, when an element is arranged by the element arranging section 40A, referring to the properties of the elements, which are registered in the storage device 30, to determine whether or not at least a part of the arranged element is overlapped with the already arranged element, that is, the overlap of the arranged element and the already arranged element. The element relation editing section 40C provides a function of, when the overlap between the elements is determined by the element overlap determining section 40B, referring to the element relation table and the relation connection table, which are registered in the storage device 30, and inheriting the relation of the already arranged element to associate the mutually overlapped elements with each other thereby providing a relation therebetween. The element information storing section 40D provides functions of, when the element is arranged by the element arranging section 40A, registering the properties of the arranged element, and also of, when the relation between the elements overlapped with each other is provided by the element relation editing section 40C, updating the element relation table and the relation connection table which are registered in the storage device 30. Further, the element arranging section 40A also provides a function of, when the relation between the elements overlapped with each other is provided by the element relation editing section 40C, displaying this relation on the display device 20.

Here, an element arranging step, element arranging means, a relation display step and relation display means are realized respectively, by the element arranging section 40A, and also, an overlap determining step and overlap determining means are realized respectively by the element overlap determining section 40B. Further, a relating step and relating means are realized respectively by the element relation editing section 40C.

Figure 4:
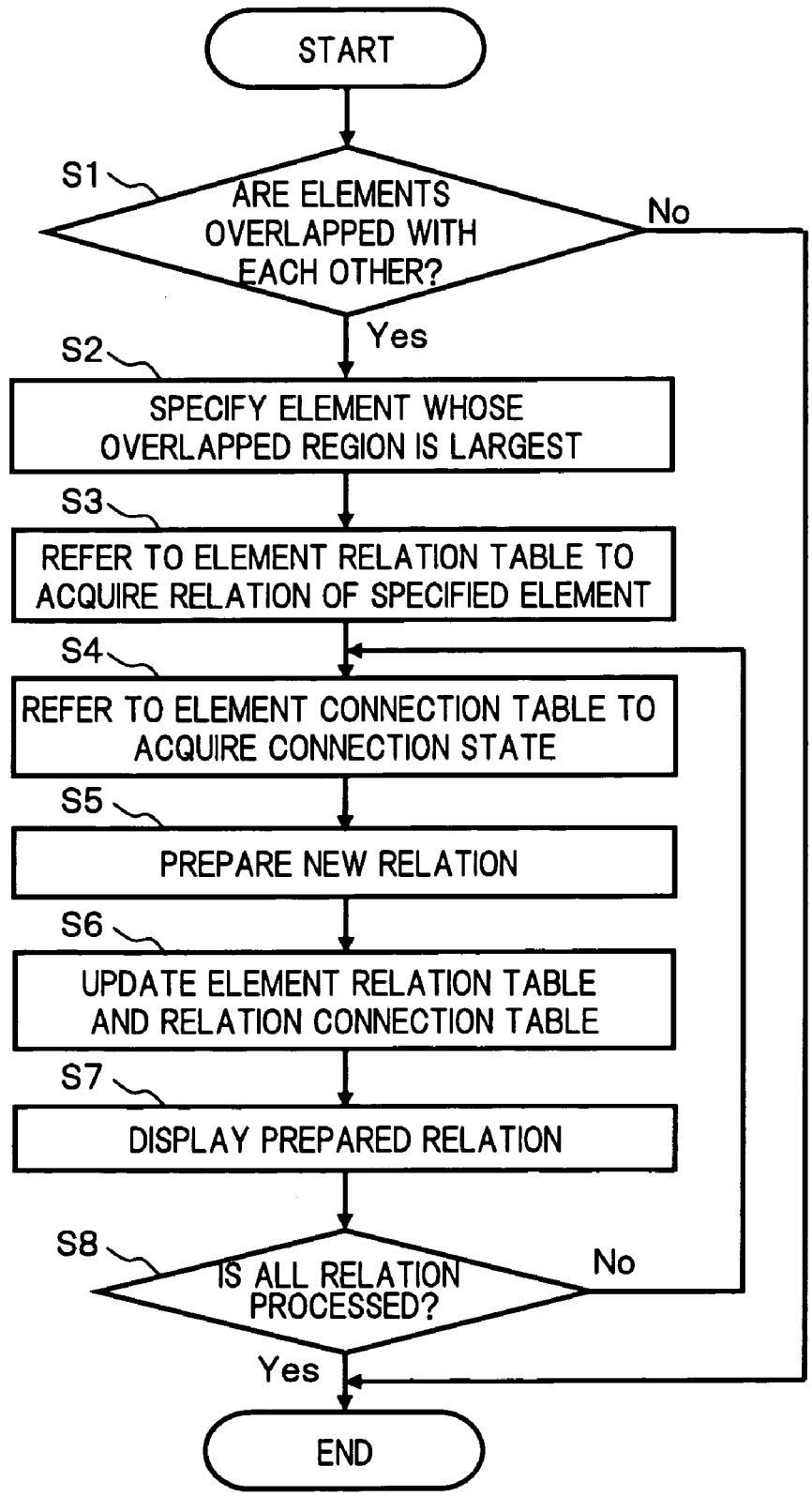
FIG. 4 is a flowchart showing the processing content of a graphics editing program.

FIG. 4 shows the processing content of the graphics editing program which is executed in the control device 40 at the moment when an element is interactively arranged. The "arrangement" herein means the concept containing the arrangement in which the already arranged element is moved to be re-arranged, in addition to the arrangement of a new element.

In step 1 (to be abbreviated as S1 in the figure, and the same rule will be applied hereunder), the properties of the elements, which are registered in the storage device 30, are referred to, and it is determined whether or not at least a part of the arranged element (to be referred to as the arranged element hereunder) is overlapped with the already arranged element. Then, when at least a part of the arranged element is overlapped with the already arranged element, the routine proceeds to step 2 (Yes), while when these elements are not overlapped with each other, the processing is terminated (No).

In step 2, when the arranged element is overlapped with a plurality of already arranged elements, the element whose overlapped region is the largest (to be referred to as the specified element) is specified from the already arranged elements. In such a manner, even if a plurality of elements is arranged close to each other, a desired element is easily selected from these elements. Incidentally, when the arranged element is overlapped with only one element, such an element overlapped with the arranged element may be made to be the specified element.

In step 3, the element relation table registered in the storage device 30 is referred to, to thereby acquire the relation of the specified element. Here, when the relation in plural numbers is provided on the specified element, all of the relation in plural numbers is acquired.

In step 4, the relation connection table registered in the storage device 30 is referred to, to thereby acquire a connection state corresponding to the relation of the specified element. Here, when the association in plural numbers is made on the specified element, all of the connection states corresponding to the association in plural numbers are acquired.

In step 5, one of the elements in the acquired connection state, to be specific, the specified element, is replaced with the arranged element, to thereby prepare the new relation.

In step 6, based on the newly prepared relation, the element relation table and the relation connection table, which are registered in the storage device 30, are updated respectively. Namely, for the element relation table, the relation of the other element in the acquired connection state is updated, and also, the relation of the arranged element is additionally registered. Further, for the relation connection table, the newly prepared relation is additionally registered.

In step 7, the relation between the arranged element and the specified element, which is provided by associating both elements is displayed on the display device 20.

In step 8, it is determined whether or not all of the relation acquired in step 3 is processed. Then, all of the relation is processed, the processing is terminated (Yes), while if all of the relation is not processed, the routine returns to step 4 (No).

According to such a graphics editing apparatus, when the element is interactively arranged in cooperative with the input device 10 and the display device 20, if the element is arranged so as to be overlapped at a part thereof with the already arranged element, the relation of the already arranged element is inherited to thereby associate the arranged element with the already arranged element to provide a relation therebetween. Then, the relation between these elements is displayed on the display device 20.

Figure 5:
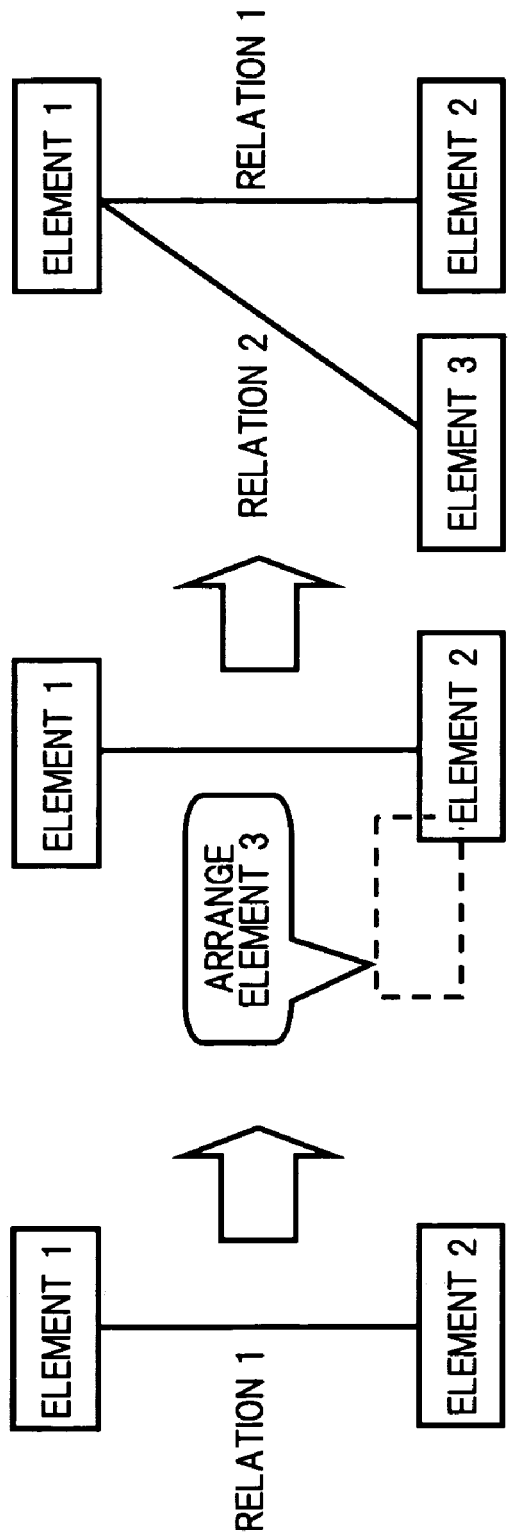
FIG. 5 is an explanatory diagram of a functional overview of the graphics editing apparatus.

Here, in order to easily understand the processing of associating and providing the relation between elements by the graphics editing apparatus, as shown in FIG. 5, the description is made in time-series on the processing for when, based on a graphic on which an element 1 and an element 2 are related to each other by the relation 1, an element 3 is arranged so as to be overlapped with the element 2.

When the element 3 is arranged, the properties of the elements, which are registered in the storage device 30, are referred to, and it is determined that at least a part of the element 3 is overlapped with the element 2. At this time, the element 3 is overlapped with only the element 2, it is specified that the specified element is the element 2. When it is specified that the specified element is the element 2, the element relation table shown in FIG. 2 is referred to, to thereby acquire the relation 1 of the element 2. Further, the relation connection table shown in FIG. 3 is referred to, to thereby acquire the connection state between the elements by the relation 1, namely, that the element 1 and the element 2 are related to each other by the relation 1. Then, the new relation 2 is prepared, in which one of the elements in the connection state by the relation 1, to be specific, the element 2, is replaced with the element 3, and as shown in FIG. 6, the relation of the element 1 is updated and also the relation of the element 3 is additionally registered in the element relation table. Further, as shown in FIG. 7, a connection state by the newly prepared relation 2 is additionally registered in the relation connection table. Thereafter, the relation 2 between the element 1 and the element 3 is displayed on the display device 20.

Therefore, it becomes possible to inherit the relation of the already arranged element with a simple operation, thereby easily associating elements so as to provide a relation therebetween, while reflecting the intent of a user as much as possible.

Here, it is desirable that there is provided an arrangement fixing function of fixing the element arrangement by the element arranging section 40A, so that, when the element arrangement is fixed by the arrangement fixing function, the element overlap determining section 40B determines whether or not at least a part of the arranged element is overlapped with the already arranged element. As the arrangement fixing function, the right-click of the mouse, the selection from menus or the like can be applied. In such a manner, even if the already arranged element is erroneously overlapped with another element when the already arranged element is moved, the relation inheriting the relation of such an element is not provided, and therefore, it is possible to associate actually desired elements with each other while providing a relation between the actually desired elements. Incidentally, an arrangement fixing step is realized by the arrangement fixing function.

Moreover, the present invention is not limited to a "UML tool", and is applicable to the software for preparing a flowchart or a CAD.

What is claimed is:

1. A computer readable recording medium recorded with a graphics editing program for realizing, in a computer the steps of:
   arranging an element interactively in cooperation with an input device and a display device;
   fixing said arranged element from said arranging step by a right click of a mouse or a selection from menus;
   determining, when said arranged element is fixed by said fixing step, whether or not at least a part of the arranged element is overlapped with an already arranged element;
   associating, when it is determined by said overlap determining step that the arranged element is overlapped with the already arranged element, the element arranged by said element arranging step through inheriting of relation of the already arranged element; and
   displaying on said display device the relation between the elements which are associated with one another by said associating step,
   wherein said fixing step is different from said arranging step;
   wherein said associating step, when the element arranged by said element arranging step is overlapped with a plurality of the already arranged elements, inherits the relation of the element whose overlapped region is the largest, to associate the elements with one another to provide a relation therebetween.

2. A graphics editing apparatus comprising:
   element arranging means for interactively arranging an element;
   element fixing means for fixing said arranged element from said arranging step by a right click of a mouse or a selection from menus;
   overlap determining means for, when the arranged element is fixed by said element fixing means, determining whether or not at least a part of the arranged and fixed element is overlapped with an already arranged element;
   associating means for, when it is determined by said overlap determining means that the arranged and fixed element is overlapped with the already arranged element, associating the arranged and fixed element through inheriting of relation of the already arranged element; and
   relation display means for displaying the relation between the elements which are associated with each other by said associating means,
   wherein a fixing operation performed on said element arrangement is different from an arranging operation of the element;
   wherein said associating means, when the element arranged by said element arranging means is overlapped with a plurality of the already arranged elements, inherits the relation of the element whose overlapped region is the largest, to associate the elements with one another to provide a relation therebetween.

3. The computer readable medium according to claim 1, wherein in said step of arranging elements interactively if said already arranged element is erroneously overlapped with another element when said already arranged element is moved, a relation inheriting said relation is not provided.

4. The graphics editing apparatus of claim 2, wherein in said element arranging means, if said already arranged element is erroneously overlapped with another element when said already arranged element is moved, a relation inheriting said relation is not provided.

* * * * *